United States Patent [19]

Tsuruta

[11] 4,154,279
[45] * May 15, 1979

[54] APPARATUS FOR REMOTELY CONTROLLING THE INTERNAL PRESSURE OF A PNEUMATIC TIRE

[76] Inventor: Yasuo Tsuruta, 22-2, 4-chome, Sanno, Ota-ku, Tokyo, Japan

[*] Notice: The portion of the term of this patent subsequent to Apr. 26, 1994, has been disclaimed.

[21] Appl. No.: 667,828

[22] Filed: Mar. 17, 1976

[51] Int. Cl.² .............................................. B60C 23/10
[52] U.S. Cl. ...................................... 152/416; 73/146
[58] Field of Search ............... 152/418, 419, 416, 415; 73/146.5

[56] References Cited

U.S. PATENT DOCUMENTS

| 1,035,207 | 8/1912 | Libby | 152/418 |
|---|---|---|---|
| 2,575,849 | 11/1951 | Steven | 73/146.5 X |
| 2,871,906 | 2/1959 | Courchesne | 152/418 |
| 4,019,552 | 4/1977 | Tsuruta | 152/417 |

Primary Examiner—Robert G. Sheridan
Assistant Examiner—D. W. Underwood
Attorney, Agent, or Firm—Brisebois & Kruger

[57] ABSTRACT

Apparatus for remotely controlling the internal pressure in a pneumatic tire, in which the inside of a pneumatic chamber mounted on a wheel is divided into a first chamber communicating with a fluid-supply source and a second chamber communicating with an air space in the tire by a diaphragm made of a flexible material. In an operation controlled from a vehicle cab, a fluid is introduced into the first chamber, thus compressing the second chamber so as to change the volume thereof, and thereby control the pressure in the air space with the tire by controlling the pressure in said second chamber.

7 Claims, 5 Drawing Figures

APPARATUS FOR REMOTELY CONTROLLING THE INTERNAL PRESSURE OF A PNEUMATIC TIRE

FIELD OF THE INVENTION

This invention relates to an apparatus for controlling the pneumatic pressure in a tire of a vehicle and the like. More particularly, the invention relates to an apparatus for adjusting the internal pressure of a tire by remote-control from the vehicle cab, regardless of whether the vehicle is running or standing still.

BRIEF DESCRIPTION OF THE PRIOR ART

In a vehicle, it is generally desirable that the internal pressure in the vehicle tires be controllable according to various running conditions. Let it be supposed that the vehicle runs continuously over roads having different surface conditions. It is desirable to set the tire pressure at a high value when the vehicle, for example, runs over a road having good surface conditions such as an expressway. However, if the tire pressure has been set at a high value when the vehicle runs over a bad road, there will be a risk that the run will become bumpy and the control of the steering wheel may be lost. Conversely, if a vehicle whose tire pressure has been set at a low value adapted to the running conditions over a bad road happens to be operated on an expressway, there will be a risk that a standing wave or hydro-planing may occur. In the case of an aircraft, the internal pressure in its tire is required to be constantly kept high in order to withstand a tremendous pressure momentarily caused at landing. However, the tire is generally maintained at high internal pressure even during running or when in flight so that fatigue of the tire is accelerated and it becomes one of the reasons that such tires burst frequently on landing.

In conventional vehicles, aircraft and the like, however, little attention has been paid to an apparatus for changing the internal pressure of a tire during running. One of the few examples is U.S. Pat. No. 3,085,912: "Wheeled Air Cushion Vehicle" (Mattson et al). However, in the apparatus of U.S. Pat. No. 3,085,912 compressed air supplied from an air source is directly pressure-fed into the tire, so that it is unavoidable that the air in the tire leaks from the rotating fittings. Accordingly, in order to prevent air-leakage, it is recognized that there are many practical difficulties to be overcome when supplying continuous pressure to all the tires at all times.

SUMMARY OF THE INVENTION

The object of the present invention is to provide apparatus for easily controlling the internal pressure in a tire by remote-control from the vehicle cab, regardless of whether the vehicle is moving or standing still.

Another object of the present invention is to provide apparatus for changing the volume of an airtight chamber communicating with an air space in the tire from the vehicle cab, and thereby controlling the pressure within said air space in the tire.

Still another object of the present invention is to provide apparatus for changing the volume of said airtight chamber by means of fluid pressure remotely controlled from the vehicle cab.

Still another object of the present invention is to provide apparatus for controlling the internal pressure in the tire by compressing under a high fluid pressure said airtight chamber within a pneumatic chamber sealed from the outside.

Still another object of the present invention is to provide a wheel for a vehicle or an aircraft equipped with a pneumatic chamber holding said airtight chamber.

Still another object of the present invention is to provide a drive shaft for a vehicle, an aircraft or the like equipped with a device for controlling the internal pressure in a tire.

Other objects of the present invention will become apparent from the following detailed description of several embodiments of the present invention, with reference to the accompanying drawings, in which.

Figure 1:
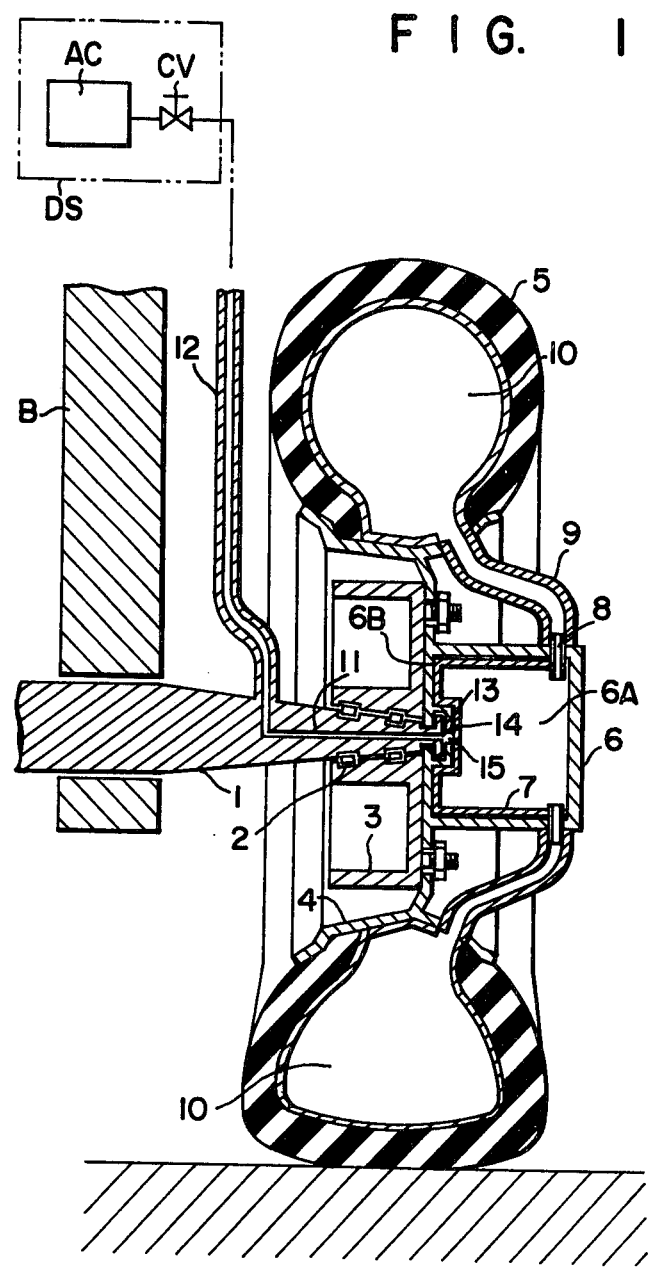
FIG. 1 is an axial sectional view taken through a first embodiment of te invention showing a tire on a wheel deflated to a low internal pressure.
Figure 2:
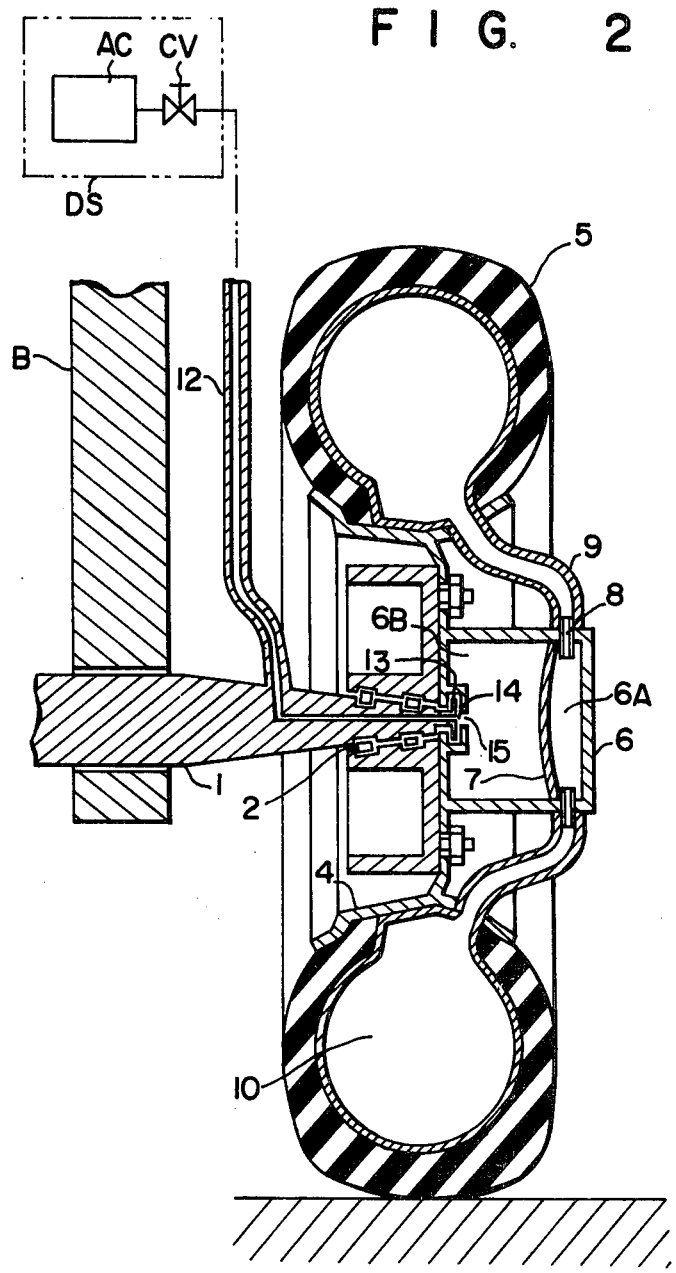
FIG. 2 is an axial sectional view taken through the same wheel showing the tire on the wheel inflated to a high pressure.

As shown in FIGS. 1 and 2, a brake drum 3 is mounted on roller bearings 2 around the end of an axle 1 supported by the body B of an automobile or an aircraft. The rim 4 of a wheel is mounted on the outer surface of the end of the brake drum 3. A tire 5 is fitted on the rim 4 and a pneumatic chamber 6 is rigidly mounted on the rim in alignment with the axis of rotation of the axle. The pneumatic chamber 6 is cylindrical and airtight. It is divided by a flexible, airtight diaphragm 7 into a first chamber and a second chamber. In the present embodiment air is used as the control fluid.

The first chamber 6B (best seen in FIG. 2) acts as a pressure chamber, while the second chamber 6A acts as an air-feeding chamber. The air-feeding chamber 6A is positioned at the outside of the wheel and communicates with an air space 10 in the tire 5 through a pipe 9 and a hollow plug 8 in the wall of the air-feeding chamber 6A. An axial air duct 11 is bored in the end of the axle 1 and a pressure-proof hose 12 communicating with a compressor AC mounted on the vehicle is connected to the air duct 11. A flow control valve CV is located in the duct 11 and controlled from the vehicle cab DS. In the tip of the air duct 11 is an air jet 14 having a flange 13 for preventing leakage of the pressurizing gas supplied through the pressure-proof hose 12, and the flange 13 is fitted in a socket 15 positioned at the inlet to the pressure chamber 6B in the pneumatic chamber 6. The jet 14 and the pressure chamber 6B are thus in communication with each other.

FIG. 1 shows the position when the air-supply from the air compressor AC is stopped. In this position, the diaphragm 7 is stretched to its left most position in the pneumatic chamber 6 due to the internal pressure in the air space 10.

Now, let it be assumed that it is necessary to raise the internal pressure in the tire, as when a vehicle is moving at a high speed or an aircraft is landing. When a high pressure fluid such as a gas is fed into the pressure chamber 6B of the pneumatic chamber 6, by operating the flow control valve CV from the vehicle cab DS, the high pressure fluid spurts into the pressure chamber 6B from the air duct 11, through the air jet 14, and presses directly against the diaphragm 7, which drives the gas sealed within the air-feeding chamber 6A into the air space 10 through the pipe 9. In consequence, the internal pressure in the air space 10 is increased and the tire 5 is highly inflated as shown in FIG. 2. Conversely, as shown in FIG. 1, when a large pulling force during starting of a vehicle is required so that the tire 5 needs a broad ground contact area, the air supply from the air compressor AC is stopped and at least some of the fluid within the pressure chamber 6B is removed so that the diaphragm 7 moves to the left in the pneumatic chamber 6. As a result, the expansion of the tire 5 is reduced and the ground contact area of the tire is enlarged.

Figure 3:
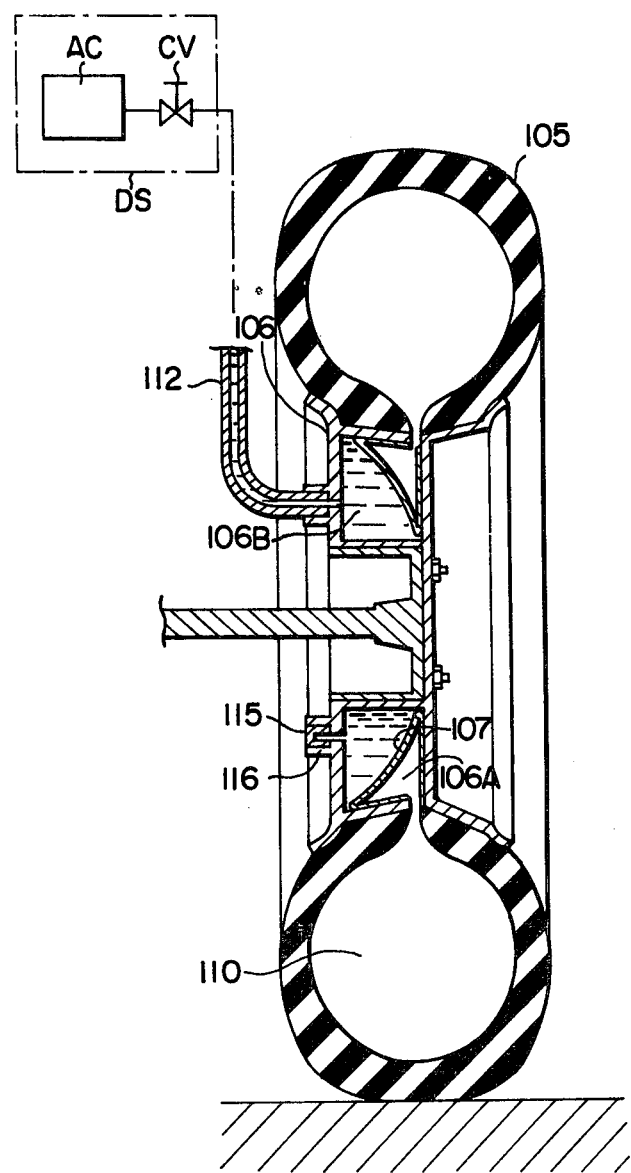
FIG. 3 is an axial sectional view taken through a second embodiment of the present invention showing the tire highly inflated.

FIG. 3 shows another embodiment according to the present invention. Although the pneumatic chamber shown in the embodiment of FIGS. 1 and 2 is constructed as a cylindrical airtight chamber facing the end of the axle 1, the embodiment shown in FIG. 3 comprises an annular pneumatic chamber 106 in the shape of a doughnut, coaxially aligned with the axle 101. The pneumatic chamber 106 holds a diaphragm 107 and the side of an air-supply chamber 106A defined by the diaphragm 107 is connected to an air space 110 in tire 105.

In this embodiment a pressure-proof hose 112 connected at one end to the air compressor AC of the body is connected at its other end to an annular nozzle 115 which is slidably seated in a cylindrical socket 116 provided on the internal wall of the pressure chamber 106B in said pneumatic chamber 106. This annular nozzle 115 rotates within the socket 116 and at the same time, supplies the fluid fed from the pressure-proof hose 112 to the pressure chamber 116B.

According to the above mentioned embodiments, the supply and exhaustion of the air in the air space in the tire is carried out via an airtight passage between said air space and the air-supply chamber in the pneumatic chamber connected therto, so that the airtightness of the tire is completely maintained. Moreover, even though the pressure against the diaphragm is provided by a fluid fed under pressure through a rotating joint which may not be completely airtight, this does not affect the airtightness of the pneumatic chamber in the tire. Indeed, the diaphragm rotates with respect to the air-supply duct, but no trouble will arise even when the diaphragm rotates violently, since the medium to transmit the pressure is a fluid. Thus it is possible to control the pressure in the tire by regulating the fluid (gas or liquid) from the vehicle cab.

Figure 4:
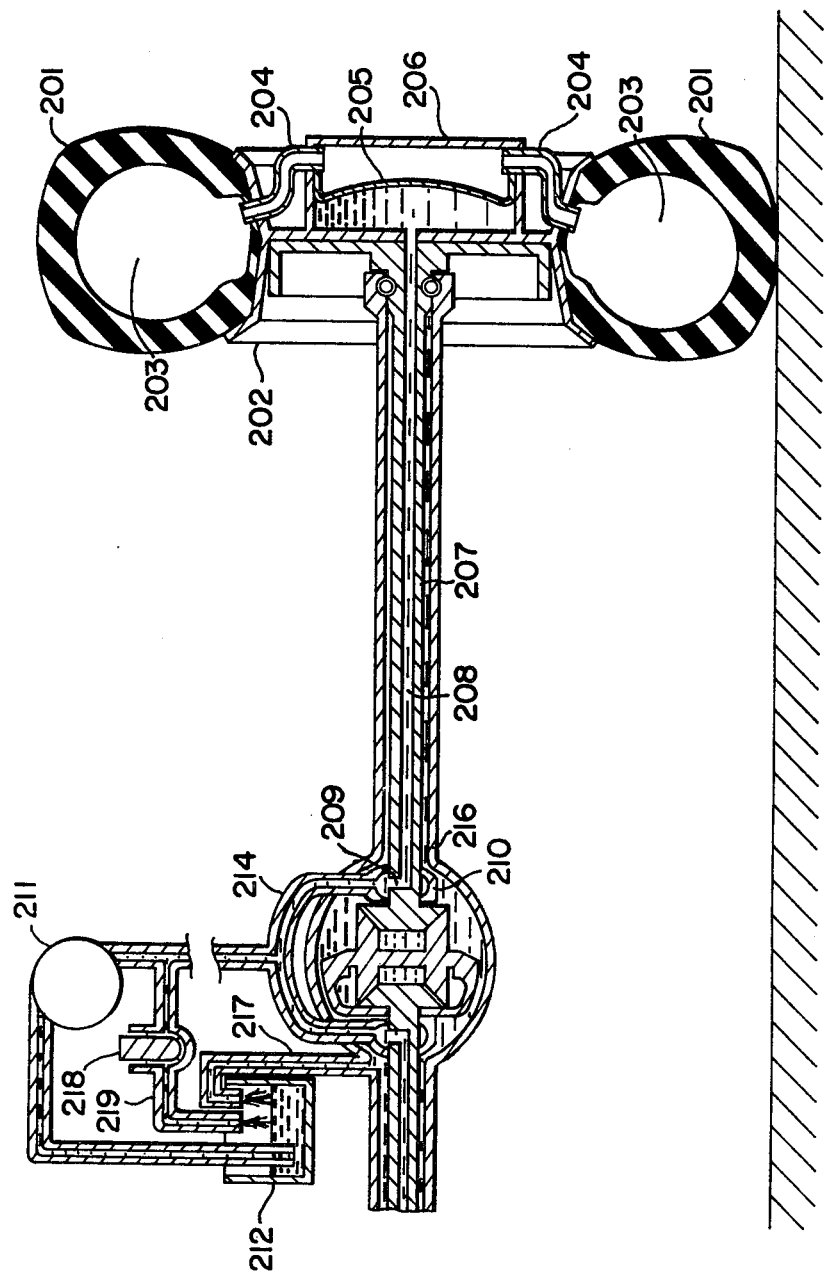
FIGS. 4 and 5 are axial sectional views showing other embodiments of the apparatus according to the present invention.
Figure 5:
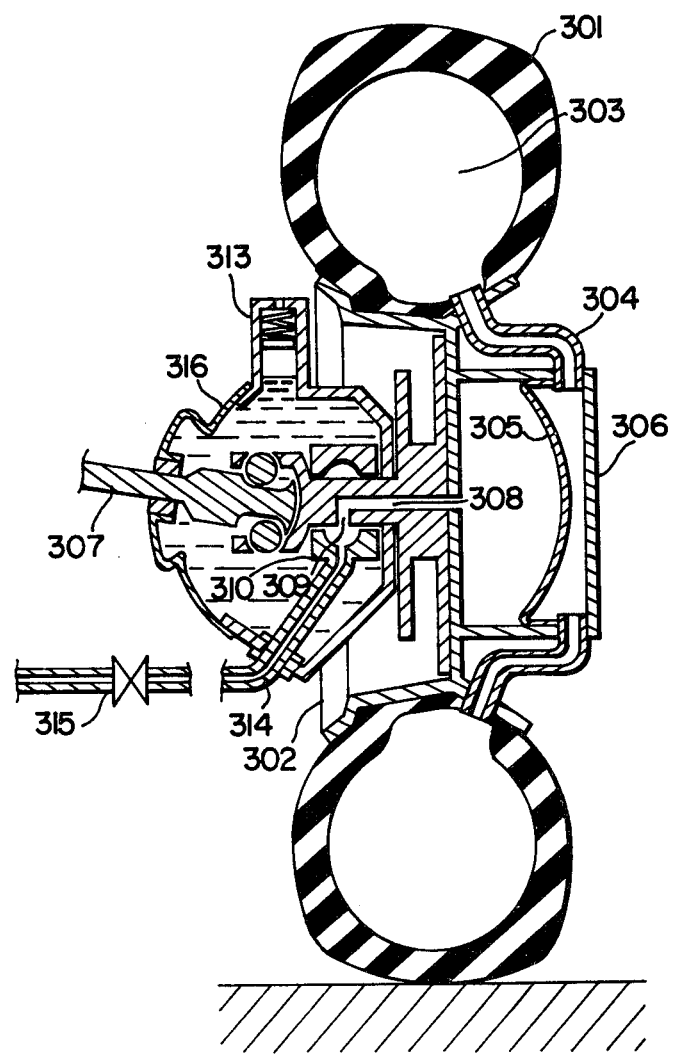

FIGS. 4 and 5 show cases in which the apparatus of the present invention is applied to the driving shaft of an automobile or aircraft respectively.

In the embodiment illustrated in FIG. 4, a cylindrical pneumatic chamber 206 is connected in an airtight manner to an air space 203 in a tire 201 by a pipe 204 and divided into two parts by a diaphragm 205. The pneumatic chamber 206 is tightly attached to an axle 202 and the axle 202 carrying the pneumatic chamber 206 is mounted on an axle shaft 207. An axial pressure supply duct 208 is bored in the axle shaft 207. This duct 208 curves just before it reaches the base of the axle shaft 207 forming a pressure-supply opening 209 in the side of the axle shaft 207. A pressure-supply housing 210 sealed to the axle shaft 207 so as to cover the pressure-supply opening 209 is connected to a pressure-supply pump 211 by means of a pressure-supply pipe 214. A sealed axle housing 216 is connected to an oil tank 212 via a return pipe 217.

When the vehicle requires expansion of the tire 201 during high speed operation, the tire 201 should be inflated strongly. In this case, when a return valve 218 is closed and oil is fed under pressure into the pressure-supply housing 210 from the pressure-supply pump 211 via the pressure-supply pipe 214, the oil is then fed into the pneumatic chamber 206 from the pressure-supply opening 209 via the pressure-supply hole 208 so as to press against the diaphragm 205 and feed the pressurized gas in the pneumatic chamber 205 into the air space 203 in the tire 201. In consequence, the internal pressure in the air space 203 is increased and accordingly the tire 201 is highly inflated.

In the system for supplying pressure from the above mentioned pressure-supply pump 211, the portions other than the fittings between the pressure-supply housing 210 and the axle shaft 207 can be completely tightened and sealed but the fittings between the pressure-supply housing 210 and the axle shaft 207 cannot be completely sealed because the axle shaft 207 rotates in the fitting. Accordingly, oil may leak into the axle housing 216 from the pressure-supply housing 210 due to the pressure by the pressure-supply pump 211. In this case, even though the quantity of oil within the axle housing 216 increases, any excess oil in the axle housing 216 flows back into the oil tank 212 through the return pipe 217 and no increase in the oil pressure in the axle housing 216 occurs. Therefore, there is no risk of the oil leaking into the fitting between the axle housing 216 and the axle shaft 207.

When increased flexibility of the tire 201 is required, as when the vehicle runs over a bad road at a low speed or stands still, and accordingly, the pressure within the air space 203 should be low, the oil-pressure from the pressure-feeding pump 211 is permitted to pass through the return pipe 219 by opening the return valve 218. Moreover, oil within the pneumatic chamber 206 flows back into the oil tank 212 through the return pipe 219 via the pressure-supply hole 208 due to the pressure against the diaphragm by the air within the pneumatic chamber 206. In consequence, the diaphragm 205 moves to the left within the pneumatic chamber 206 and the pressure within the air space 203 drops, thereby reducing the expansion of the tire 201.

By adjusting the extent to which the return valve 218 opens and closes the quantity of the oil being fed from the pressure-pump 211 and returned into the return pipe 219 can be changed, thereby adjusting the pressure transmitted to the pressure-supply system and to the pneumatic chamber 206. By balancing the pressure against the diaphragm 205 with the pressure within the air space 203, the movement of the diaphragm 205 within the pneumatic chamber 206 can be adjusted to change the pressure in the air space 203 to a desired level and maintain it so that it is possible to suitably remote-control the degree of pressure within the tire 201 in conformity with the conditions of the roads over which the vehicle is travelling.

In the embodiment illustrated in FIG. 5 a gas is used instead of a pressure-supply liquid.

In this case, a small chamber 313 communicating with the open air is mounted on the top of an axle housing 316. The other main structural elements are essentially the same as in the aforementioned embodiments.

As shown in FIG. 5, in order to inflate a tire 301, a valve 315 is opened to jet the gas into the pneumatic chamber 306 from a pressure-supply pipe 314 via a pressure-supply hole 308 in a pressure-supply housing 310, thereby exerting pressure against a diaphragm within the pneumatic chamber, and exhausting gas from the chamber 306 into the tire so that the internal pressure within the tire 301 increases and the tire is inflated.

The fitting between the pressure-supply housing 310 and an axle shaft 307 is soaked in a lubricating oil carried within the axle housing 316 so that it is sufficiently sealed, unlike the case in which the fitting is exposed in the air.

When the vehicle runs at a high speed for long hours, it is required to supply pressure into the pneumatic chamber 306 for a long time, and even if the gas starts to leak from the fitting between the pressure-supply housing 310 and the axle shaft 307, the leaked oil is collected into the chamber 313 and then exhausted, so that it is possible to prevent the pressure from acting on the lubricating oil within the axle housing 316.

When the axle housing 316 is well sealed and there is no risk of the oil leaking out at a certain oil pressure, it is possible to improve the airtightness of the pressure-supply housing 310 by replacing the chamber 313 with one of a safety valve type and thereby generating oil-pressure due to the leaked gas in the axle housing 316.

When the sealing of the axle housing 316 is extremely good and sufficient oil-tightness can be maintained against a high oil pressure, the pressure-supply housing 310 can be eliminated from the pressure-supply systems, so that the oil within the axle housing 316 is pressurized and this pressure is transmitted through 308 to the diaphragm 305.

What is claimed is:

1. Apparatus for remotely controlling the internal pressure in an air space within a tire, said apparatus being mounted in a vehicle and comprising:

a pneumatic chamber coaxially mounted on a wheel,
   a flexible fluid-tight diaphragm dividing said pneumatic chamber into two parts and preventing the transfer of fluid between said parts,
   means for connecting one of said chamber parts to the air space in said tire and means for connecting the other of said chamber parts to a source of fluid under pressure, said chamber parts being otherwise sealed, and
   means operable from a point near a control station from which said vehicle is controlled for remotely controlling the flow of fluid under pressure to and from said other chamber part to selectively increase and decrease the tire pressure.

2. Apparatus as claimed in claim 1, in which the pneumatic chamber is mounted coaxially on one end of an axle and a nozzle communicating with the fluid-supply source and positioned at said end of the axle opens into said other chamber part.

3. Apparatus as claimed in claim 2, wherein said nozzle carries a flange for preventing leakage which fits into a socket in the wall of the pneumatic chamber.

4. Apparatus as claimed in claim 1, in which the pneumatic chamber is annular and coaxially disposed around one end of an axle, and fluid from the source of fluid under pressure is introduced into an annular socket provided on the edge of said annular pneumatic chamber through an annular ring.

5. Apparatus as claimed in claim 1, in which the pneumatic chamber is attached to the end of an axle housing and one end of a pressure-supply duct in the axle housing communicates with said other part of the pneumatic chamber, while the other end of said supply duct is connected through said axle housing to a gas supply source, and comprising a gas outlet to the open air mounted on said housing.

6. Apparatus as claimed in claim 1, wherein said other part of said pneumatic chamber communicates directly with the inside of a hollow axle housing, and the lubricating oil within the axle housing is under pressure urging said oil into said other part of said pneumatic chamber.

7. Apparatus as claimed in claim 1, in which the pneumatic chamber is attached to he end of an axle housing and one end of a pressure-supply duct in the axle housing communicates with said other part of the pneumatic chamber, while the other end of said pressure-supply duct is connected through said axle housing and a pressure-supply pump to an oil tank.

* * * * *